Figure 1:
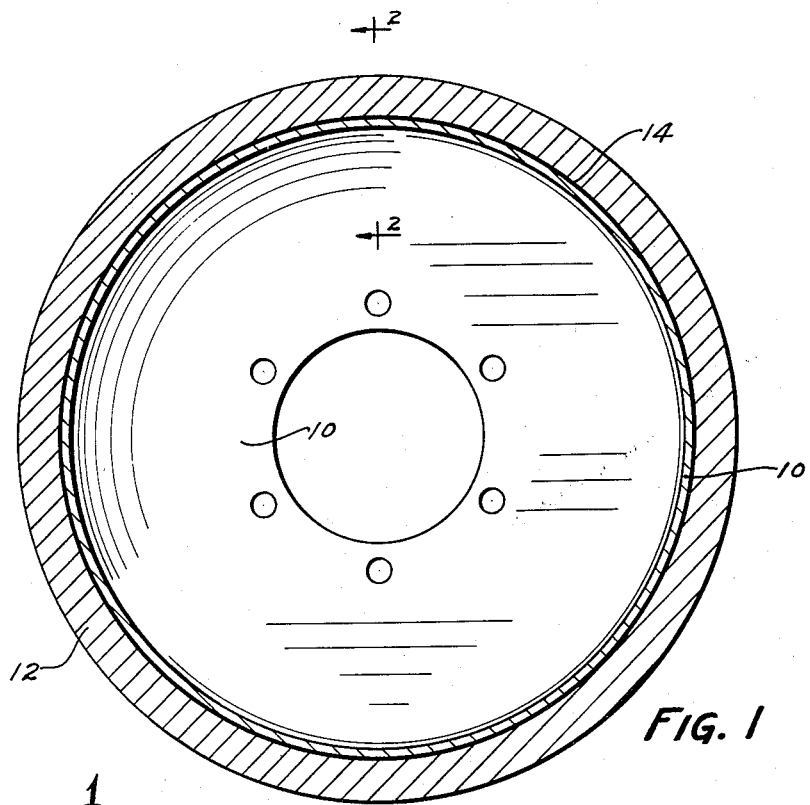

Feb. 22, 1938.   F. C. FRANK   2,109,110
BRAKE DRUM
Filed Sept. 16, 1935

INVENTOR.
FREDERICK C. FRANK.
BY
ATTORNEY

Patented Feb. 22, 1938

2,109,110

UNITED STATES PATENT OFFICE 2,109,110

BRAKE DRUM

Frederick C. Frank, South Bend, Ind., assignor to Bendix Products Corporation, South Bend, Ind., a corporation of Indiana Application September 16, 1935, Serial No. 40,719

1 Claim. (Cl. 188—218)

This invention relates to brake drums and more particularly to brake drums adapted for use where uniform high coefficients of friction and heat emissivity must be combined with maximum strength per unit weight of the structure.

When designing brake drums for aircraft it is necessary that the drum occupy the minimum space consistent with the requirement that the aircraft when fully loaded must be capable of stopping within a specified distance after contacting the ground. It is therefore necessary that a very strong brake drum be provided.

In view of the small dimensions allotted to the braking structure of aircraft, and to avoid drag losses while in flight, it is desirable that the coefficient of heat emissivity be as great as possible to adequately transmit the frictional heat generated during braking action from the brake drum to the atmosphere, to prevent burning the friction lining ordinarily carried on the brake shoes adapted to be expanded into engagement with the brake drum.

To secure a uniform high coefficient of friction, it is desirable to employ a brake drum having a steel friction surface. A brake drum formed entirely of steel is, however, too heavy for satisfactory use in aircraft, and the coefficient of heat emissivity for steel is not as high as for many of the lighter metals and alloys such as aluminum. It is therefore desirable to form a brake drum having a steel liner surrounded by a heat radiating and rigidifying shell formed of an alloy to more rapidly conduct the heat generated during braking and to provide a strong light-weight structure.

In order to secure the most rapid rate of heat dissipation from one body to another it is necessary that the bodies be in intimate contact. It has, however, been found difficult to position an alloy shell on a steel liner with a sufficient degree of tightness to secure maximum or even desirable heat dissipation from the liner to the shell.

An object of this invention is therefore to provide a brake drum comprising a steel liner having an alloy shell intimately fused thereto to effect rapid heat dissipation from the liner to the shell.

Another object of the invention is to provide an aircraft brake drum including a friction liner having a uniform high coefficient of friction and a rigidifying heat radiating shell having a high coefficient of heat emissivity.

A further object of the invention is to provide novel means for intimately fusing an alloy shell on a steel liner.

Other objects and advantages of this invention will be apparent from the following detailed description, taken in connection with the illustrative embodiment thereof in the accompanying drawing, submitted for purposes of illustration only and not intended to define the scope of the invention, reference being had for that purpose to the subjoined claim.

Figure 2:
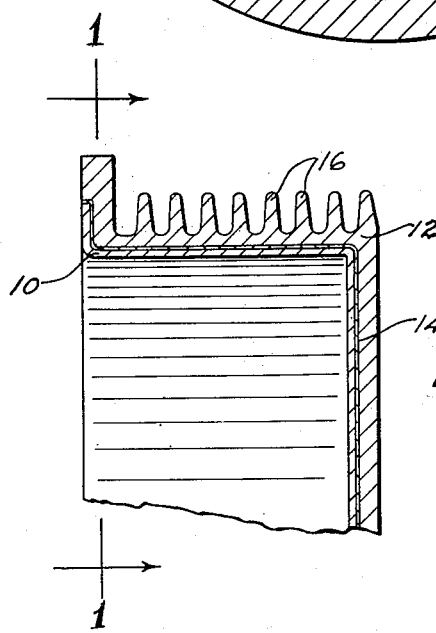

In the drawing, wherein similar reference characters refer to similar parts throughout the several views:

Figure 1 is a sectional view in elevation of a brake drum, taken on the line 1—1 of Figure 2; and Figure 2 is a sectional view taken on the line 2—2 of Figure 1.

Referring to the drawing, there is shown a brake drum including a steel liner 10 having an aluminum alloy shell 12 surrounding and intimately fixed thereto in a novel manner now to be described.

The steel liner 10 is heated and is then hot-dipped in molten zinc. Zinc and steel having a high affinity for each other immediately fuse, whereupon a thin coating of zinc 14 is formed on the outside of the steel liner. The zinc-coated liner is then placed in a mold while hot and an aluminum alloy or other suitable alloy having a high coefficient of heat emissivity, and low weight per unit volume is flowed into the mold. The aluminum alloy has a high affinity for zinc so that a fusing action takes place. The steel liner and the aluminum shell are thus intimately fused together and form in effect a one-piece brake drum having a steel friction liner and an aluminum rigidifying and heat dissipating shell.

The aluminum shell 12 may be formed with heat radiating flanges 16 to facilitate the dissipation of heat to the atmosphere, and to provide the maximum rigidifying effect with the minimum weight.

It will be understood that the method disclosed herein is not limited to brake drums, but may be employed wherever it is desired to form an article having a steel liner surrounded by a mass of material of a different consistency such, for example, as in the manufacture of engines where the cylinders are formed with steel liners.

It will also be understood that although the brake drum has been described and illustrated with particular reference to aircraft brake drums, it is not intended to limit the invention to aircraft brake drums, because the brake drums of land vehicles may as well be formed in accordance with this invention.

While the invention has been illustrated and described with particular reference to a preferred embodiment, it is not intended to limit the scope of the invention to the features illustrated and described, nor otherwise than by the terms of the following claim.

I claim:

An airplane brake drum comprising a steel liner having a closed end provided with an aperture to receive a wheel supporting member and an open end, a reinforcing web flanged outwardly at the open end of the liner, a thin coating of zinc applied to the outer surface of the liner, an aluminum body section including heat radiating and rigidifying flanges cast around the steel liner and intimately connected thereto through the zinc coating.

FREDERICK C. FRANK.